United States Patent [19]

Escolar et al.

[11] Patent Number: 5,028,401

[45] Date of Patent: Jul. 2, 1991

[54] APPARATUS FOR OBTAINING FERRIC OXIDE AND AMMONIUM SALTS

[76] Inventors: Luis Escolar; Helio Nupieri, both of Av. Rigolleau 2036, 1884 Berazategui, Argentina

[21] Appl. No.: 235,486

[22] Filed: Aug. 4, 1988

Related U.S. Application Data

[62] Division of Ser. No. 133,448, Dec. 15, 1987, Pat. No. 4,935,219.

[30] Foreign Application Priority Data

Dec. 17, 1986 [AR] Argentina .................. 306206

[51] Int. Cl.$^5$ .............................. B01F 3/04
[52] U.S. Cl. ................... 422/224; 422/156; 422/158; 422/193
[58] Field of Search ............. 422/224, 49, 129, 135, 422/145, 158, 150, 152, 156, 189, 193; 34/57 E; 261/78.2, 116; 423/633; 55/449, 459.1

[56] References Cited

U.S. PATENT DOCUMENTS

| | | | |
|---|---|---|---|
| 3,361,525 | 1/1968 | Rycke et al. | 422/150 |
| 3,600,817 | 8/1971 | Klein | 34/57 E |
| 3,734,761 | 5/1973 | Becker et al. | 422/158 |
| 3,954,921 | 5/1976 | Yoshida et al. | 261/78.2 |
| 4,073,874 | 2/1978 | Fukushima | 423/633 |
| 4,600,417 | 7/1986 | Sasaki et al. | 55/459.1 |

*Primary Examiner*—David L. Lacey
*Assistant Examiner*—William H. Beisner
*Attorney, Agent, or Firm*—Fleit, Jacobson, Cohn, Price, Holman & Stern

[57] ABSTRACT

A vertical cylinder reactor which comprises a plurality of vertically coupled cylindrical modules. An upper end of the reactor, a first module, employs a spraying device for subdividing a liquid reactant into a plurality of small droplets and a toroidal ring for introducing a gas reactant around the liquid phase droplets. A second module connected downstream to the first is provided with a gas inlet jacket for introducing a heating and/or drying gas into the reactor. Connected to the second module is a third module which has a tangential gas inlet for introducing a gas tangentially into the reactor. Finally the reactor is provided with a conical bottom and an outlet conduit for removing gas containing fine solid particles.

1 Claim, 1 Drawing Sheet

APPARATUS FOR OBTAINING FERRIC OXIDE AND AMMONIUM SALTS

This is a divisional of application Ser. No. 133,448, filed Dec. 15, 1987, now U.S. Pat. No. 4,935,219.

FIELD OF THE INVENTION

The present invention is related to a process for obtaining ferric oxide and ammonium salts from aqueous solutions of iron salts which have been prepared with such purpose, or from liquid industrial waste containing them. The invention further relates to an apparatus for carrying out said process.

Chlorides and/or sulphates are preferred amongst the iron salts.

DESCRIPTION OF THE PRIOR ART

Iron oxide of mineral origin has been used in ancient times in its red, yellow and brown varieties.

With the object of improving the quality and, particularly, the dyeing power of oxides, techniques for the obtention of synthetic oxides have been developed since the XIX century.

One of the earliest methods was the obtention of red oxide from the calcination of ferrous sulphates crystals resulting from the exhausted scaling liquors. The sulphate was decomposed into red ferric oxide and sulphurous anhydride, and the resulting oxide showed a poor quality and, particularly, a high acidity.

Later on a method was known for obtaining yellow oxide, which is a hydrated ferric oxide, by the wet route. In large vertical reaction vessels scrap steel was submerged into a slurry of an iron hydroxide and ferrous sulphate solution, air-oxidized and heated. The thus obtained yellow oxide was subject to calcination in rotating ovens, yielding a range of red ferric oxides of higher quality than the former oxides. This is one of the yet presently employed methods.

About 1950 a method was found for obtaining red ferric oxide directly by the wet route, without calcination. This method is similar to that already mentioned of the synthetic yellow: in a vertical cylindric reacting vessel scrap steel is introduced in a slurry of a particular gel of iron hydroxide (separately prepared by reaction of ferrous sulphate with caustic soda under air-bubbling) and a ferrous sulphate solution; air is blown into the mass and it is heated. The quality of the product obtained through this method is excellent.

There exists a certain number of bibliography and patents of the most varied origins, describing methods for the obtention of iron oxides. Most of them are represented by a solution for the recovery of scaling liquors. Some of them are briefly described hereinbelow:

1. Gaseous hydrogen chloride bubbling into a ferrous chloride solution, thus lowering the solubility of this compound which precipitates, is separated and burnt to recover the hydrogen chloride and result in ferric oxide through air-oxidation.

2. In U.S. Pat. No. 2,642,334 issued in 1953, the addition of sodium hydroxide solution into the scaling liquor with sulphuric acid causes the ferric oxide to precipitate (through oxidation with the air oxygen). The ferric oxide is filtered-off, and the filtrate is treated with calcium oxide to precipitate calcium sulphate. The latter is in its turn filtered-off, and the waste liquid returned to the cycle, since it is a sodium hydroxide solution.

3. A ferrous sulphate solution is treated with warm air, which evaporates the waste water and yields ferric oxide.

4. According to U.S. Pat. No. 3,153,575 (1964) a scaling liquor is sprayed with sulphuric acid and the waste water is evaporated through continuous feeding of heat gases. There results ferrous sulphate, which is calcinated to give ferric oxide and sulphur dioxide.

5. According to the method disclosed by U.S. Pat. No. 2,433,498 (1947) heptahydrated ferrous sulphate crystals are subject to burning to give ferric oxide, sulphur dioxide, sulphur dioxide, sulphur trioxide and water.

6. Through the addition of a sodium hydroxide solution, in the scaling liquor ferrous hydroxide is precipitated and then oxidized with the air to yield ferric oxide.

7. According to Indian Patent No. 42,281 (1949), ammonia and air streams are passed through the scaling liquor. There precipitates ferric oxide, which is separated by sedimentation. The ammonia is recovered from the ammonium sulphate waste solution by treatment with magnesium oxide.

8. U.S. Pat. No. 2,529,874 (1950) discloses a process for obtaining ammonium salts and magnetic iron oxide from ferrous salt solutions. Said process is carried out in aqueous phase and the resulting iron oxides are brownish.

9. U.S. Pat. No. 2,605,169 (1952) an air-ammonia mixture is bubbled into ferrous chloride solutions from exhausted scaling liquor up to the whole iron is caused to precipitate. The precipitate is filtered-off, washed, dried and calcinated. The dry product basically consists in ferric oxide. The resulting ammonium chloride is almost iron-free.

Finally, there exist other important methods which are being worldwide employed, starting from exhausted steel sheet scaling solutions. These methods were developed with the object of recovering the acids for their recyclation and avoid pollution by the effluents being involved. Said processes are: Ruthner process for iron chloride and Surgi process for iron sulphate. In these processes, the ferrous sulphate is sprayed in a reaction vessel at high temperature in the presence of water-steam and air, thus producing the hydrolysis of the same. In this manner, the hydrochloric or sulphuric acid is recovered to give iron oxide.

The thus obtained oxides are inadequate for pigments due to their low dyeing power, violet shade, the remaining acidity and the high soluble salts contained therein.

SUMMARY OF THE INVENTION

The process according to the invention, starting from the reaction of iron chlorides, sulphates with ammonia is different from Ruthner and Surgi processes in several aspects:

1. There are obtained ammonium chlorides, sulphates and sulphites and ferric oxide rather than hydrochloric or sulphuric acid and ferric oxide.
2. The ferric oxide is a pigment-type one, and its shade can be varied even in the same equipment through changes of the operating conditions.
3. The ferric oxide is obtained almost free of soluble salts, in view of that the residual ammonium chloride or sulphate is evaporated.
4. The reaction is carried out in excess ammonia, and permits working under much chemically wilder conditions than Ruthner or Surgi processes, which work through hydrolysis of the ferrous chloride or sulphate, resulting in hydrochloric or sulphuric acid. Equipments become thus cheaper.

5. The method of the present invention avoids the difficult filtration of the iron oxide precipitate as in the wet route method, and the wash of the soluble salts of this precipitate.

Comparing the process of the invention with other known processes which are carried out in aqueous phase, it should be noted that it has the advantage of not needing the water-evaporation step to be carried out to afford dry products. It is furthermore cheaper in connection with the reactants and equipment being employed.

Particularly, it is a novel process since no process is known in the prior art employing a spray of ferrous chloride or sulphate solution in the presence of gaseous ammonia in the bosom of a reacting vessel.

This invention relates to the treatment of iron salt solutions to produce iron oxides having different shades of violet (browns, reds and violets) and, more particularly, to the preferable utilization of chlorides or sulphates and, amongst them, specially those resulting from the scaling in iron roll-out processes. The process leads to the production of pigment-type red iron oxide in its several shades; further resulting in pure ammonium chloride, sulphate and sulphite as by-products.

Many industrial processes yield iron chloride, as waste product, but the problem is to find a use or recovery thereof, not only due to the financial loss but also to the problems derived from the pollution of natural sources by said waste.

The present invention intends solving the problem through a process wherein the iron chloride or sulphate is converted into ammonium chloride or sulphate and sulphite and ferric oxide. As the raw material there is waste solutions based on hydrochloric or sulphuric acid and containing iron chlorides or sulphates are subject to treatment.

The object of the present invention is to provide a process enabling the simultaneous and separate recovery of ions iron chloride or sulphate contained in the feeding solution, in the form of ammonium chloride or sulphate and sulphite and ferric oxide, respectively. For the achievance of said purpose, the preferred working process and apparatus according to the invention hereinbelow described are employed.

The process which protection is applied for comprises heating of a dew or spray of the iron chloride or sulphate, in the presence of gaseous ammonia, water and an oxidizing means, usually air, within a temperature range permitting the formation of ferric oxide as sediment and vaporized ammonium chloride or sulphate and sulphite, thus rendering their separation easier, and, in a further step, recovering the ammonium chloride or sulphate and sulphite from the gaseous phase by cooling a saturated aqueous solution and crystallization and/or washing.

Specifically, the process of the invention comprises:
(a) reacting in a reaction vessel a dew or drop-spray of an aqueous iron salt solution (preferably, ferrous or ferric iron chlorides and/or sulphates) or of liquid industrial waste containing them at a concentration of at least 5 g % w/w, with an ammonia stream in an at least stoichiometric ratio in relation with the iron salts corresponding to an excess enough to neutralize the free acidity, when it occurs, thus producing particles of an aggregate of ammonium salts and hydrated iron oxides;

(b) oxidizing and drying said particles by simultaneously or separately contacting with at least a gaseous means, an oxidizing means being at least a component thereof, at a temperature not lower than the sublimation and/or decomposition temperature of the corresponding ammonium salt(s), under its partial pressure in the gaseous mixture;

(c) recovering the sublimated ammonium salt(s) from said vehicle gases;

(d) recovering the resulting ferric oxide.

The reaction is carried out at temperatures related to pressure, to achieve the separation of the ammonium chloride. For instance, when working under atmospheric temperature and pressure, the temperature should not be lower than the sublimation temperature of the chloride under said conditions.

The process preferably comprises the steps of spraying the aqueous solution in a reaction vessel whereinto gaseous ammonia and air (oxygen) are introduced, said reaction vessel being at a temperature range between 80° and 900° C., either by prior warming-up of the feeding gases or external heating through its walls.

This results in the formation of solid ferric oxide and vaporized ammonium chloride, sulphate or sulphite, which are partially separated in the reaction chamber itself depending on their physical condition and then, completely separated through conventional gas-solid separation methods.

An important advantage of the present invention is that the ammonium chloride, sulphate or sulphite are separated in the vapor form from the ferric oxide, thus facilitating the obtention of the latter, free of impurities. This desirable condition is achieved by the temperature reached by the products before leaving the reaction chamber, which is higher than the sublimation temperature of said ammonium salts.

Another important achievement is that the whole reaction occurs rapidly, which fact facilitates the continuous production of ferric oxide. Additionally, the final quality is such that no further purification is required and direct use in every application is possible, which is actually hardly achieved with the known industrial processes.

An important fact of the invention is also constituted by the direct obtention of said ferric oxide, free of impurities, and in the form of a very fine powder, in several shades, which is achieved through an adequate regulation of the operating conditions, especially of the temperature, and of the oxidizing ability of the gaseous means since, as the temperature rises, red-violaceous shades are obtained and, with low temperatures, high brown and red-orange shades are achieved. This renders the process highly versatile and permits the obtention of the different qualities intended for commercial use.

BRIEF DESCRIPTION OF THE DRAWINGS

Within the scope of the invention.

DESCRIPTION OF THE PREFERRED EMBODIMENTS

Figure 1:
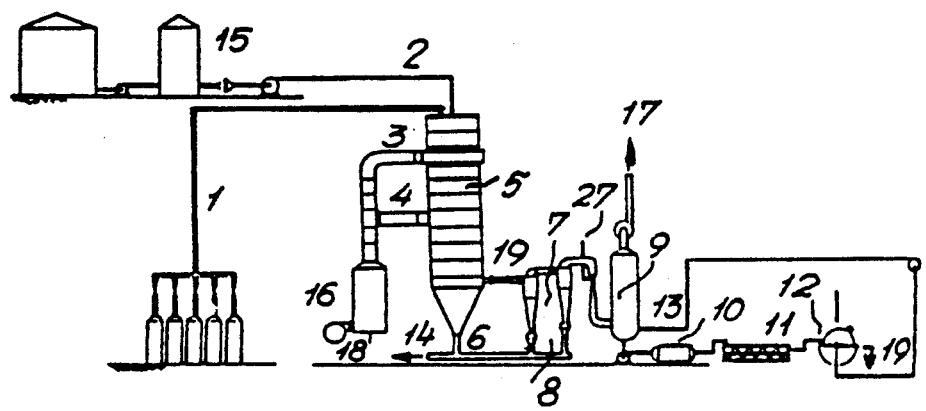
FIG. 1 schematically shows the preferred equipment permitting the process to be carried out under the conditions of the present application, which does not mean a particular restriction of the invention.
Figure 2:
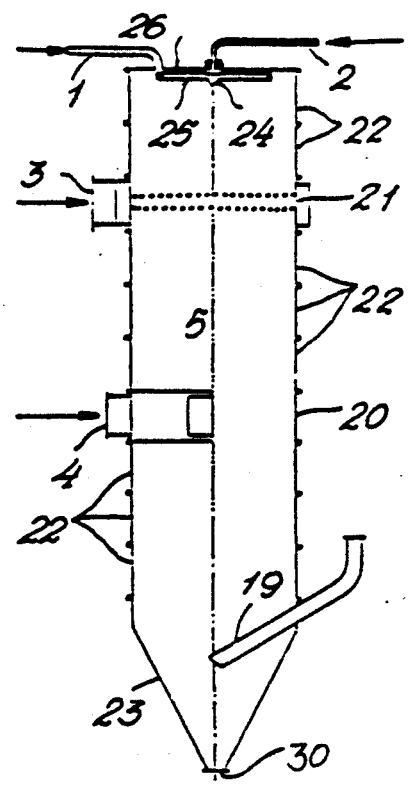
FIG. 2 illustrates in detail the reaction vessel wherewith said equipment is composed, and which also constitutes a component of this invention. Dryers, for instance of a similar mechanical structure, are known, but their object is not identical. The reaction vessel of this invention makes possible reactions to take place in aerosol phase wherein liquids and/or gases and/or solids are involved.

Considering the scheme of FIG. 1, the raw material (iron chloride, sulphate or sulphite solution in water) having a concentration comprised between 5% w/w and that of the solution saturation at the selected temperature, is conducted through line (2) up to a continuous reaction vessel (5) tailored to produce several physical and chemical transformations leading to the production of ferric oxide, as main product, and ammonium chloride, sulphate or sulphite, as by-products.

The reaction vessel comprises a zone wherein the spray or dew of the iron chloride or sulphate solution takes place in an atmosphere, mainly of gaseous ammonia, fed through line (1). This zone works at temperatures between 40° and 400° C., thus permitting a contact time of the mist droplets with the gaseous means of 0.1 to 10 seconds.

The ammonia injection is done in such a manner that the dispersed solution is surrounded. Once the gaseous ammonia and the dispersion droplets have reacted, the latter will enter the evaporation zone.

In this section, a mixture of warm air and combustion gases (or any of them alone) is injected through line (3) to evaporate the aqueous solvent and to produce solid particles consisting in an aggregate of corresponding ammonium salt and iron oxides having different oxidation and hydration degrees.

At this height of the reaction vessel a further stream of warm air and combustion gases or any of them separately, are horizontally introduced through line (4) and tangentially to the vessel wall, with the purpose of completing the dehydration of the solid aggregates and the oxidation of the ferrous oxide to ferric oxide, and to facilitate the separation of the solid products. The temperature at which this process is complete ranges from 350° up to 900° C., and the contact time between the solid particles and the warm gases should not be lower than one second. The section bottom is preferably conical, designed in such a manner to obtain a cyclonal effect with the injected gases and an outlet thereof by means of a central intake leading them, together with fine particles, to a solid-gas separation system. The latter can be constituted by a battery of cyclones, as shown in (7), or by any other equipment of conventional use in said step. The ferric oxide separated in (6) and (7) passes through lines (6) and (8), respectively, and is collected by means of a conventional solid transportation system (14), which drives them through (18) to the storage and packaging steps.

The gaseous stream separated by cyclones (7) contains water, combustion gases, air and the corresponding ammonium salts and/or decomposition products thereof and yet carries a small quantity of fine particles. A great deal of well known alternatives are known for the separation of these products.

The scheme of FIG. 1 illustrates one of these alternatives, wherein the remaining fine particles of iron oxide are eliminated through the use of a washing tower (9). Prior to this step, the gaseous stream is cooled to allow this production alternative by injection of sprayed water through (27), thus making possible the solid ammonium chloride, sulphate or sulphite to precipitate as gas-driveable microcrystals. In tower (9), as washing stream fed through (13) there is employed a non-saturated ammonium chloride, sulphate or sulphite which absorbs the gaseous ammonium chloride, sulphate or sulphite mixed up with the gases coming from the battery of cyclones, and holds the fine particles of ferric oxide. This solution is pumped while warm through a filter (10), to separate the pigment residues, and is introduced into a crystallizer (11). The remaining gases, mainly composed of nitrogen, water, carbon dioxide and oxygen, are set free to the atmosphere through (17).

The last mentioned equipment permits the crystallization of the corresponding ammonium salts to occur by cooling of the solution coming from the washing tower. On the filter (12), the ammonium salt crystals are separated through (19) from the mother liquors, poor in ammonium chloride, sulphate or sulphite, are recirculated through (13) to the washing tower for further recovering ammonium salt. During the filtration the crystals are optionally subject to a water wash. The solid product is driven to a conventional drying step, prior to its storage and/or packaging. The filtered, recirculated product can be partially drained, and water can be added in its place.

The crystallization could be effected by means of any known method, for instance a crystallization caused by evaporation of the solution water, or any other similar alternative.

For the obtention of ammonium salts which quality is not affected by the presence of iron oxide, some cooling and solid recovery step can be included at the outlet of the gases coming from the cyclones (7), always by conventional methods, either by a wet route similar to that employed in the tower (9), or by dry route such as, for instance, cyclones, sleeve filters, electrostatic precipitators, etc.

FIG. 2 illustrates a novel reaction vessel which is a further object of the present invention and which represents the reaction vessel (5) of FIG. 1 of the equipment conceived for the production of iron oxide from ferrous salt solutions.

The main body is constituted by a vertical cylinder having a conical bottom (23) in which upper section has a cover (26) bearing two main devices:

1. in its central portion, a locking system permitting the passage through a line (2) which drives the ferrous salt solution towards the main body where it is to be sprayed. At its end, this line has a device (24) permitting the spraying of the solution, in very small drops having a mean size lower than 200 microns.
2. Surrounding the spraying device (24), a perforated toroidal ring (25), whereby a gaseous ammonia stream is introduced through line (1). This device permits creating an ammonia-rich atmosphere which surrounds the cloud of dispersed droplets of the liquid solution; thus, there is created a first zone of the reaction vessel, wherein the dispersed solution absorbs ammonia, precipitating the ferrous hydroxide.

The cylindrical body is formed by several coupling modules (20) (21) (22), for the regulation of the reactor total height, as well as the location of each of them, in this way allowing different uses.

The modules such as (22) contribute only to increase the reactor height, and therefore they increase the stay time in the area in which they are located.

The modules of type (21) have a surrounding sleeve, for receiving through the conduit (3) a flow of hot air, combustion gases or both, which enter the cylindrical body through a plurality of perforations placed along the perimeter. Said device allows hot gases to enter for drying the drops containing the precipitated ferrous hydroxide, and generated according to the above mentioned description. At the same time, they are positioned in such a manner that, depending on the size of the drops which are formed by the pulverization, they allow said drops totally absorb the ammonia required for the ferrous hydroxide precipitation before completing their path.

At the central part of the cylindrical main body and after hot gases have entered through the distribution system (21), the steps of drying, ammonium salt vaporization and decomposition and oxidation of ferrous hydroxide, which turns into ferric oxide, take then place.

The module (20) has a tangential hot gases inlet (4), design completing the above described process, and in order to give the gases and the solids a helicoidal movement for their primary separation by means of a cyclonic effect produced by the conical bottom (23) and the outlet center opening (19).

Placed at the bottom (30) there is a butterfly or rotary valve or another device for the periodical or continuous removal of the accumulated solids.

The gases evacuated through (19) are led to a cyclonic system in order to complete the separation of solids.

The equipment can be made of stainless steel AISI 316L, AISI 315 titanium-rich, Hastelloy C, or other metals or metallic corrosion-resistant alloys from acids and chlorides and/or sulfates and sulfites. It can also be made of carbon steel sheet or other materials, its interior part coated with metallic corrosion-resistant surfaces, or with refractory materials, with or without intermediate layers that separate them from the external cover.

The obtained ferric oxide can be used for paintings, cements, ceramics, plastics, rubber, paper, cosmetics, electronic, etc.

The resulting ammonium chloride can be obtained with suitable qualities for its use as fertilizers, for electrical batteries or piles, the cleaning previous to a welding, galvanizing and in pharmaceutical uses, etc.

The resulting ammonium sulphite quality is suitable for photography.

EXAMPLE 1

It was performed using the present invention apparatus.

A volume of 317.5 kg/h of a 30% ferrous chloride solution at 25° C., was introduced into the reactor (5) through the spraying system (24) being the size of the drops from 10 to 12μ; simultaneously, gaseous ammonia was incorporated at the rate of 26 kg/h and hot air was injected at different heights: the upper line (3) near the sprayer (1.130 kg at 1.065° C.) for carrying of the water vapour generated within the reactor and the almost total drying of the hydrated iron oxide and the lower line (4) (850 kg at 1.020° C.) raised temperature of reactive mass above 350° C., producing the ammonium chloride sublimation, the iron oxide oxidation and its complete dehydration. The hot air injected in the lower part (4) was introduced tangentially to produce a cyclonic movement within the reactor which helps the separation of the ferric oxide from the remaining gases (air, water, vapour, ammonium chloride).

After leaving the reactor the gaseous mass with the rest of the fine ferric oxide particles was passed through the cyclones 7–8; then, the emerging hot gases were cooled (27) by means of the water injection at the ambient temperature, producing a "flash" (adiabatic), whose mixture (ammonium chloride crystals, fine particles ferric oxide and gases) passed to an absortion tower or "scrubber" (9) where a water flow circulated which dissolved the ammonium chloride. Once saturated, the solution was filtered (19) in order to separate the ferric oxide from fine particles, and the ammonium chloride solution crystallized by cooling (11).

Under these conditions a total of 1,37 kg of ammonium chloride and 1,06 kg of ferric oxide per minute was obtained.

The ammonium chloride was obtained in the form of crystals and the rest remained in the other liquid (which was recycled).

The ferric oxide was obtained in (6), (7), (8) and in the filter sludge (19).

Similarly but with the temperature above 350° C., darker ferric oxides can be obtained with the same efficiency; as the temperature increases, colour turns to violet.

Likewise, replacing the ferrous chloride solution for an industrial waste, as in an exhausted pickling liquor (from chlorihydric acid), it is previously necessary, to make a reaction with metallic iron in order to neutralize the free chlorhydric acid and to adjust the concentration to 30% w/w. A similar result was obtained when the procedure was repeated.

EXAMPLE 2

100 ml of the solution of 33% ferrous chloride at 25° C. was pulverized during a minute with an air flow within a conduit having a diameter of 25 cm and the length of 1,70 cm, wherein gaseous ammonia circulates at a rate of 9 g/min. The conduit is opened to the atmosphere and externally warmed so that its interior temperature reaches 400° C. The outlet of said horizontal pipe is provided with the surface at ambient temperature where pure ammonium chloride crystals sublimed. Within the warmed pipe, the red salt-free ferric oxide decanted due to gravity.

30 g ammonium chloride and 22,3 g ferric oxide per minute was obtained.

EXAMPLE 3

An exhausted solution of pickling chlorhydric acid was neutralized by means of its warming on scrap, at 80° C. and the concentration was adjusted at 33%. Said solution was filtered and fed under same conditions as in Example 2, with similar results.

EXAMPLE 4

100 ml solution of 25% p/w ferrous sulphate at 40° C. was pulverized during a minute under the same conditions as in Example 1, except that:

(a) the interior temperature was not lower than 550° C.

(b) the amount of ammonia was adjusted between the stoichiometric ratio and this with an excess of 5%.

The reaction gases were captured and dissolved in water, obtaining a solution of ammonium sulphates and sulphites whose ratios vary according to the conditions of ammonia excess, temperature within the pipe and humidity. The ferric oxide remained within the pipe.

EXAMPLE 5

An already exhausted solution of sulphuric acid of iron and its concentration was adjusted at 25% p/w of ferrous sulphate.

The solution thus prepared was submitted to the conditions of the Example 4, with similar results.

We claim:

1. Apparatus for reacting reagents in an aerosol form, said apparatus comprising:
    a vertical cylinder comprising a plurality of coaxial, vertically coupled cylindrical modules, said plurality of cylindrical modules including at least a first module, a second module and a third module, the first module comprising a single cylindrical wall and defining an upper end of said vertical cylinder, the second module comprising an inner wall having a plurality of holes formed therethrough and an outer wall spaced apart from and extending around the inner wall thereby defining a space between the inner wall and the outer wall of the second module, said space being in fluid communication with the interior of the vertical cylinder through the holes in the inner wall of the second module, and the third module having a tangential inlet formed therein for introducing a gas tangentially into the interior of the vertical cylinder, the second module being located between the first module and the third module;
    a conical bottom provided at the lower end of said vertical cylinder, said conical bottom comprising a wall and having valve means at the conical lower end thereof;
    a cover provided at the upper end of said vertical cylinder to seal said vertical cylinder;
    a first inlet conduit positioned and arranged so as to introduce a first reagent in the form of a solid dissolved or suspended in a liquid phase into the interior of said vertical cylinder through said cover;
    a spraying device constructed so as to subdivide the liquid phase into small droplets provided within the interior of said vertical cylinder adjacent said cover, said spraying device being in fluid communication with said first inlet conduit;
    a second inlet conduit positioned and arranged so as to introduce a second reagent in the form of a gas stream into the interior of said vertical cylinder through said cover;
    a toroidal ring provided within the interior of said vertical cylinder adjacent said cover such that said toroidal ring surrounds said spraying device, said toroidal ring having a plurality of holes therein and being in fluid communication with said second inlet conduit;
    a gas inlet conduit in fluid communication with the space between the inner wall and the outer wall of the second module so as to introduce a gas from said gas inlet into the interior of said vertical cylinder through the holes in the inner wall of the second module; and
    an outlet conduit extending through the wall of said conical bottom adjacent the lowermost cylindrical module of said vertical cylinder such that one end of said outlet conduit is located within the upper portion of said conical bottom and the other end of said outlet conduit is located outside said conical bottom and said vertical cylinder.

* * * * *